United States Patent [19]

Goscenski, Jr.

[11] 4,280,375
[45] Jul. 28, 1981

[54] CONTROLLED DIFFERENTIAL

[75] Inventor: Edward J. Goscenski, Jr., Battle Creek, Mich.

[73] Assignee: Eaton Corporation, Cleveland, Ohio

[21] Appl. No.: 63,012

[22] Filed: Aug. 2, 1979

[51] Int. Cl.³ .......................... F16H 1/44; F16H 1/40
[52] U.S. Cl. ...................................... 74/711; 74/713
[58] Field of Search ................. 74/710.5, 710, 711, 74/713

[56] References Cited

U.S. PATENT DOCUMENTS

| | | | |
|---|---|---|---|
| 1,938,457 | 12/1933 | McCaffery | 74/711 |
| 2,389,498 | 11/1945 | Gates | 74/710.5 |
| 2,709,927 | 6/1955 | Van Meter | 74/711 |
| 2,924,122 | 2/1960 | Foster | 74/705 |
| 3,025,722 | 3/1962 | Eger, Jr. et al. | 74/711 |
| 3,034,322 | 5/1962 | Miller | 74/711 X |
| 3,392,601 | 7/1968 | Roper | 74/711 |
| 3,405,574 | 10/1968 | Livezey | 74/705 X |
| 3,448,635 | 6/1969 | Nelson | 74/711.5 |
| 3,448,636 | 6/1969 | Roper et al. | 74/711 |
| 3,517,573 | 6/1970 | Roper | 74/711 |
| 3,724,289 | 4/1973 | Kennicutt | 74/711 |
| 4,077,279 | 3/1978 | Goscenski, Jr. | 74/711 |
| 4,117,744 | 10/1978 | Butculescu | 74/705 X |

FOREIGN PATENT DOCUMENTS 183712 8/1922 United Kingdom .

Primary Examiner—Leslie Braun
Attorney, Agent, or Firm—R. J. McCloskey; J. Yakimow; M. L. Union

[57] ABSTRACT

A differential assembly includes a case (12), an input (30) for effecting rotation of the case, pinion means (36, 38) associated with the case, a pair of side gears (32, 34) meshing with the pinion means, a first output shaft (26) connected to one of the side gears and a second output shaft (28) connected to the other of the side gears. The differential assembly further includes a first gear train (54) associated with the first output shaft and rotatable therewith, a second gear train (52) associated with the second output shaft and rotatable therewith, and a third gear train (30, 70) associated with the casing and rotatable therewith. A first clutch (80) is provided for interconnecting the third gear train and the first gear train to enable the third gear train to supply additional torque through the first gear train to the first output shaft when the rotational speed of the input exceeds the rotational speed of the first output shaft by a predetermined amount. A second clutch (74) is provided for interconnecting the third gear train and the second gear train to enable the third gear train to supply additional torque through the second gear train to the second output shaft when the rotational speed of the input exceeds the rotational speed of the second output shaft by a predetermined amount.

11 Claims, 3 Drawing Figures

CONTROLLED DIFFERENTIAL

BACKGROUND OF THE INVENTION

1. Field of the Invention

The present invention relates to a differential assembly for a vehicle and more particularly to a differential assembly including an auxiliary gear drive system for supplying additional output torque to a non slipping output shaft of the differential assembly wherein one of the output shafts is slipping and the other of the output shafts is non slipping.

2. Background of the Invention

There are many known differential gear mechanisms in the prior art which are utilized to compensate for slipping of one of the drive wheels of a pair of drive wheels of a vehicle. In a normal or open differential equal torque is provided to a pair of output shafts. The input speed to the differential equals the average output speed of the two wheels. The output speeds of the two wheels are normally equal or substantially equal in normal situations where the vehicle is going in a straight line or slightly turning. In a standard differential when one of the wheels starts to slip relative to the other, such as when the vehicle is stuck, the amount of torque transmitted to the non slipping wheel will decrease due to the fact that the torque delivered by the slipping wheel decreases and equal torque will be provided by the two output wheels. Thus, the standard differential will operate to only transmit the magnitude of torque to the non slipping wheel which is equal to the magnitude transferred to the slipping wheel. Thus, in a slipping situation, the amount of torque delivered to the output wheels is limited to twice the torque being transmitted by the slipping wheel which can approach zero. This is an undesirable situation.

In an effort to solve the problem set forth above, limited slip differentials have been designed. The limited slip differentials allow unequal torques to be transmitted to the two driving wheels. This allows additional torque to be added to the non slipping wheel to allow it to dig in when one of the wheels is slipping. Another differential is disclosed in U.S. Pat. No. 4,077,279 which utilizes a weight member which is actuated by inertial force to trigger locking of the output shafts together upon slipping of a predetermined degree. The use of a locking mechanism which is actuated by inertial force requires the differential gear mechanism to be rotating at a predetermined speed before the inertial force can actuate the locking mechanism.

Another known limited slip differential is disclosed in U.S. Pat. No. 3,448,635, which discloses the use of friction plates to add resistance torque to the slipping output wheel. Adding resistance torque to the slipping wheel enables additional torque to be transmitted to the non slipping wheel due to the fact that equal torque is transmitted to each of the output driving wheels. The use of friction plates causes undesirable heating characteristics and undesirable wear characteristics in the limited slip differential.

Another known differential mechanism is disclosed in Great Britain patent specification No. 183,712, having an application date of July 27, 1921. The British patent specification discloses a differential gear mechanism which provides for a predetermined maximum difference in the relative speeds of the two output members and includes control means which are actuated to prevent any further difference in the relative speed of the driven members when the predetermined maximum difference is sensed.

SUMMARY OF THE INVENTION

The present invention relates to a new and improved differential assembly including a case, an input, pinion means associated with the case, a pair of side gears meshing with the pinion means and connected to first and second outputs, first torque transmitting means associated with the first output shaft, second torque transmitting means associated with the second output shaft, and third torque transmitting means associated with the casing. A first clutch is provided for interconnecting the third torque transmitting means and the first torque transmitting means to enable the third torque transmitting means to supply additional torque to the first output through the first torque transmitting means when the rotational speed of the input exceeds the rotational speed of the first output by a predetermined amount. A second clutch means is provided interconnecting the third torque transmitting means and the second torque transmitting means to enable the third torque transmitting means to supply additional torque to the second output through the second torque transmitting means when the rotational speed of the input exceeds the rotational speed of the second output by a predetermined amount.

Another provision of the present invention is to provide a new and improved differential assembly as set forth in the next preceeding paragraph wherein the first clutch means is a bidirectional one way clutch which is operable to enable the third torque transmitting means to drive the first torque transmitting means when the rotational speed of the input in a first direction exceeds the rotational speed of the first output by a predetermined amount and when the rotational speed of the input in a second direction opposite the first direction exceeds the rotational speed of the first output by a predetermined amount and wherein the second clutch means is a bidirectional one way clutch which is operable to enable the third torque transmitting means to drive the second torque transmitting means when the rotational speed of the input in a first direction exceeds the rotational speed of the second output by a predetermined amount and when the rotational speed of the input in a second direction, opposite the first direction, exceeds the rotational speed of the second output by a predetermined amount.

Still another provision of the present invention is to provide a new and improved auxiliary drive system for supplying additional output torque to a non slipping output shaft of a differential assembly having a slipping output shaft and a non slipping output shaft, a case, input means associated with the case for driving the case, pinion means associated with the case, and a pair of side gears meshing with the pinion gears with one of the side gears driving one of the output shafts and the other of the pair of side gears driving the other output shaft. The auxiliary drive system includes a first torque transmitting means associated with the one output shaft, second torque transmitting means associated with the other output shaft and third torque transmitting means associated with the input means. The auxiliary drive system further includes clutch means operatively connected to the third torque transmitting means and selectively connectable with the first torque transmitting means or the second torque transmitting means. The clutch means connects the third torque transmitting means and the first torque transmitting means when the rotational speed of the input means exceeds the rotational speed of the one output shaft by a predetermined amount indicating the other output shaft associated with the second torque transmitting means is slipping relative to the one output shaft. When the first and third torque transmitting means are interconnected, the third torque transmitting means supplies additional output torque through the first torque transmitting means to the one output shaft which is not slipping. The clutch means is further operable to connect the third torque transmitting means and the second torque transmitting means when the rotational speed of the input means exceeds the rotational speed of the other output shaft means by a predetermined amount indicating the one output shaft associated with the first gear means is slipping relative to the other output shaft. When the second and third torque transmitting means are interconnected the third torque transmitting means supplies additional output torque through the second torque transmitting means to the other output shaft which is not slipping.

A further provision of the present invention is to provide a differential assembly including a case, an input, pinion means, a pair of side gears meshing with the pinion means, a first output in driving engagement with one of the side gears and a second output in driving engagement with the other of the side gears. First torque transmitting means is associated with the first output, second torque transmitting means is associated with the second output, and third torque transmitting means is associated with the case. The first torque transmitting means transmits torque between the first output and the third torque transmitting means, the second torque transmitting means transmits torque between the second output and the third torque transmitting means and the third torque transmitting means is selectively adaptable to transmit torque between the case and the selected one of the first torque transmitting means and the second torque transmitting means. A first clutch is provided to interconnect the first and third torque transmitting means to supply additional torque to one of the input means or the first output to prevent speed of the input means from varying from speed of the first output by more than a predetermined value and a second clutch is provided to interconnect the second and third torque transmitting means to supply additional torque to one of the input means or the second output to prevent the speed of the input means from varying from the speed of the second output by more than the predetermined value.

A still further provision of the present invention is to provide a new and improved device including an input member, a first output member, a second output member and first torque transmitting means for transferring torque between the input and the output members in a fixed proportional relationship. The first torque transmitting means accommodates rotation of the first and second output members at angular velocities relative to one another and to the angular velocity of the input member. A second torque transmitting means is provided responsive to the angular velocity of one of the members varying from the angular velocity of at least another of the members by a predetermined value to transfer torque between one of the members and another of the members.

Another provision of the present invention is to provide a new and improved device including an input member, first output member, a second output member and first torque transmitting means for transferring torque between the input member and the output members in a fixed proportional relationship wherein the sum of the torque on the output members is substantially equal to the torque on the input member. The first torque transmitting means accommodates rotation of the first and second output members at a fixed proportional differential angular velocity between the output members with respect to the input member. A second torque transmitting means is provided responsive to the angular velocity of one of the members varying from angular velocity of at least another of the members by a predetermined value to transfer torque between one of the members and another of the members.

A still further provision of the present invention is to provide a device including an input member, a first output member, a second output member and first torque transmitting means for transferring approximately half of the input torque to each of the output members. The first torque transmitting means accommodates rotation of the output members such that the sum average of the angular velocities of the output members is substantially equal to the angular velocity of the input member. A second torque transmitting means is provide responsive to the angular velocity of one of the members varying from the angular velocity of at least another of the members by a predetermined value to transfer torque between one of the members and another of the members.

Figure 1:
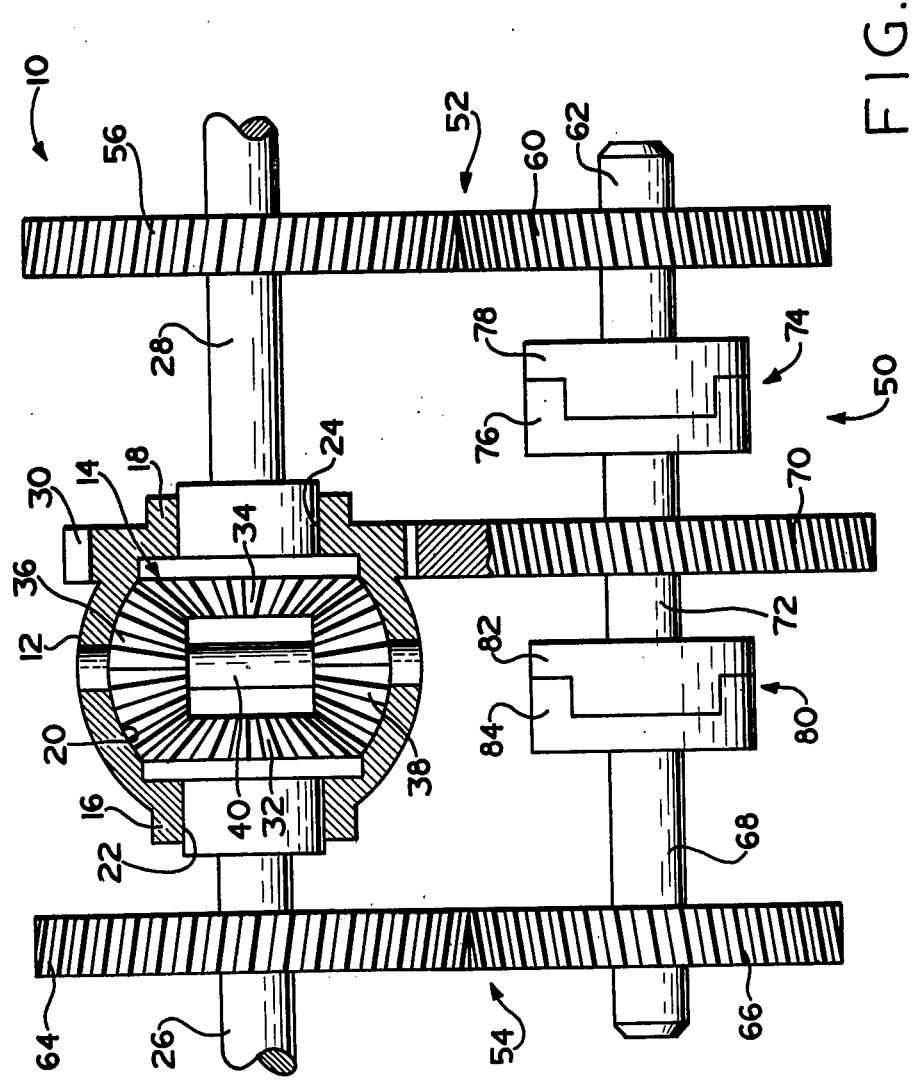
FIG. 1 is a schematic view of the differential assembly of the present invention utilizing an auxiliary gear drive system.

FIG. II is a schematic fragmentary side view of a bidirectional clutch which may be used in the auxiliary gear drive system of the present invention.

FIG. III is a sectional view taken approximately along the line 3—3 of FIG. II more fully illustrating the bidirectional clutch.

DESCRIPTION OF THE PREFERRED EMBODIMENT

The differential drive assembly 10 is especially suitable for use in driving ground or surface engaging traction wheels of a vehicle. The differential drive assembly includes a rotatable planet gear carrier or casing 12 and a differential gear train 14. The planet carrier 12 includes a pair of support portions 16 and 18 adapted to be received in bearings of a supporting structure, such as an axle housing, not shown, by which the carrier 12 is rotatably supported. The planet gear carrier 12 defines a gear chamber 20 in which the gear train 14 is located. The support portions 16, 18 are provided with axial openings 22, 24 which communicate with the chamber 20 and receive or accommodate driven or power output means as represented by axle shafts 26, 28, respectively, whose outer end portions are connected with traction wheels, or the like, not shown, and whose inner or adjacent end portions are connected with the gear train 14 by suitable splines, not illustrated, which are formed on the inner ends of shafts 26, 28.

The differential drive assembly 10 includes a ring gear 30 extending around and mounted on the carrier 12. A suitable drive pinion, not shown, meshes with the ring gear 30 and represents the power input means for the differential drive assembly 10 and upon rotation effects rotation of the ring gear 30 to rotate the planet carrier 12.

The gear train 14 is operable to transmit the rotary motion of the planet carrier 12 to the output shafts 26, 28. The gear train 14 includes a pair of bevel side gears 32, 34 and a group of bevel pinion planetary gears 36, 38, disposed between and meshed in engagement with the side gears 32, 34 for drivingly connecting the latter. The planetary gears 36, 38, are rotatably supported in the carrier 12 by means of a pinion shaft 40 extending across the gear chamber 20 and secured to the carrier 12 by an anchor pin, not shown.

The side gears 32, 34 and pinion gears 36, 38 are, in the preferred embodiment, all bevel gears of conventional form as far as the teeth thereof are concerned, and the tooth profiles are of a conventional shape having pressure angle values coming within the usual range of such values. The side gears 32, 34, are provided with splines, not illustrated, which mesh with the splines on the output shafts 26, 28, to drivingly connect the side gears 32, 34 to the shafts 26, 28, respectively. The structure and operation of a differential gear mechanism utilizing a differential gear train such as gear train 14, is more fully disclosed in U.S. Pat. No. 3,392,601 which is incorporated herein by reference.

The differential mechanism 10 also includes an auxiliary drive system 50 which in the preferred form is the auxiliary gear drive system for supplying additional output torque to a non slipping output shaft 26, 28 of the differential assembly 10 when one of the output shafts 26, 28 is slipping and the other is non slipping. The auxiliary gear drive system 50 includes a first gear set 52 which is driven at a speed dependent upon the output speed of shaft 28 and a second gear set 54 which is driven at a speed dependent upon the speed of the output shaft 26.

The first gear set 52 includes a first gear 56 which is keyed to the output shaft 28 for rotation therewith and a first auxiliary gear 60 which is keyed to an auxiliary shaft 62 for rotation therewith. The output gear 56 could be of the same diameter as the auxiliary gear 60 with which it meshes. Thus, gears 56 and 60 rotate at the same speed along with the shafts 28 and 62 which are respectively connected to the first gear 56 and the auxiliary gear 60.

The second gear set 54 includes an output gear 64 which is splined to output shaft 26 to rotate therewith and an auxiliary gear 66 which is splined to an auxiliary drive shaft 68 to rotate therewith. Gear 64 meshes with auxiliary gear 66. Output gear 64 can have the same diameter as auxiliary gear 66 to enable the rotational speed of gear 64 and shaft 26 to equal the rotational speed of gear 66 and auxiliary shaft 68 to which it is splined.

A third gear set is rotated at a speed dependent upon the speed of the casing 12. The third gear set includes the ring gear 30 and an auxiliary gear 70 which meshes therewith. The auxiliary gear 70 is supported on an auxiliary shaft 72 for rotation therewith. The gear ratio between ring gear 30 and auxiliary gear 70 is chosen such that gear 70 turns at a given percentage of case speed slower than ring gear 30 and slower than either of the output gears 56, 64 when gears 56 and 64 are rotating at the same speed as the casing 12 or for any other tractive vehicle maneuver including all turns. Preferably, the ring gear 30 has a diameter which is 70% of the diameter of auxiliary gear 70 so that the auxiliary gear 70 preferably rotates at a speed which is approximately 70% of the speed of ring gear 30 and casing 12.

While first, second and third gear sets have been illustrated as transmitting torque to the output shafts 26 and 28, other suitable torque transmitting mechanisms such as belts and pulleys or frictional torque transmitting mechanisms could be utilized without departing from the scope of the present invention.

Clutch means is provided for selectively interconnecting the auxiliary shaft 72 driven by ring gear 30 and auxiliary gear 70 with either the auxiliary shaft 62 or the auxiliary shaft 68 when the drive speed of shaft 72 tries to become greater than the speed of the auxiliary shaft 68 or 62 to which the drive shaft 72 will be connected by the clutch means. The clutch means includes first and second bidirectional one way clutches 74 and 80 which may be similar to the type of clutch disclosed in U.S. Pat. No. 3,448,636, as will be more fully disclosed herein below.

The first clutch 74 is adapted to interconnect the auxiliary drive shaft 72 with the auxiliary drive shaft 62 when the speed of auxiliary drive shaft 72 tries to become greater than the speed of auxiliary drive shaft 62. The bidirectional one way clutch 74 includes an input side 76 which is connected to the auxiliary drive shaft 72 for rotation therewith and an output side 78 which is connected to the auxiliary drive shaft 62 for rotation therewith. The bidirectional one way clutch 74 is a one way clutch which will disengage and permit the output 78 to rotate faster, absolute, with respect to the input 76. When the input 76 tries to exceed (absolute) the output speed of shaft 62, the clutch 74 will lock with no or negligible slip and the input 76 will transmit all additional input torque to drive the output 78. The output 78 of clutch 74 drives the output shaft 28 via the auxiliary shaft 62, and auxiliary gear 60 and the output gear 56. Thus, when clutch 74 engages the gear 70 will be rotating at the same speed as the gears 56, 60. Engagement of the clutch 74 will allow additional torque to be transferred via the auxiliary shaft 62 and gears 60, 56 to supply additional driving torque to output shaft 28.

The second one way clutch 80 is provided to interconnect the auxiliary shaft 72 with the auxiliary shaft 68 when the absolute rotational speed of auxiliary shaft 72 tries to exceed the absolute rotational speed of auxiliary shaft 68. The bidirectional one way clutch 80 includes an input member 82 which is connected to rotate with shaft 72 and an output member 84 which is connected to rotate with auxiliary shaft 68. The bidirectional one way clutch 80 will disengage and permit the output 84 to rotate faster, absolute, with respect to the input. However, when the input 82 rotates faster, absolute, than the speed of the output 84, the clutch 80 will lock with no or negligible slip and the input 82 will transmit all additional input torque to drive the output 84. Thus, when clutch 80 locks, the auxiliary shaft 72 will be operable to supply additional driving torque to the output shaft 26 via the auxiliary shaft 68 and gears 64, 66.

Figure 2:
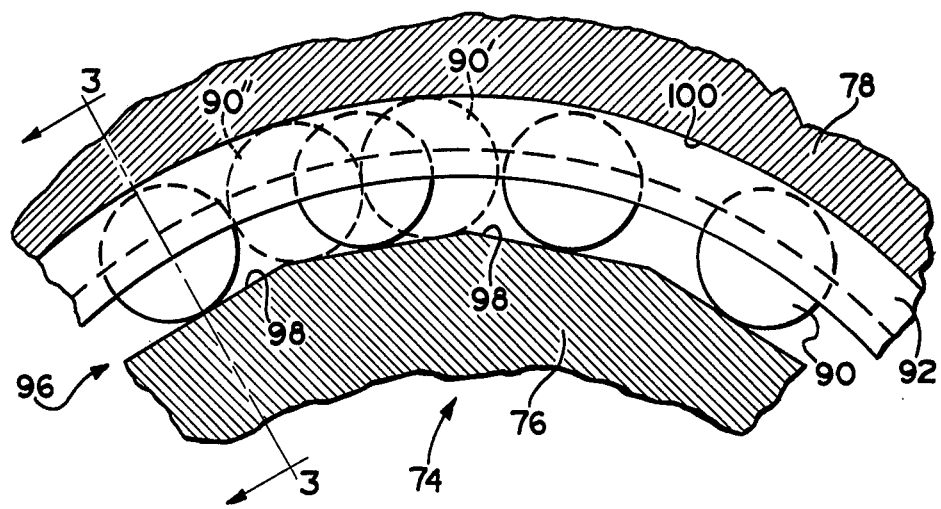
Figure 3:
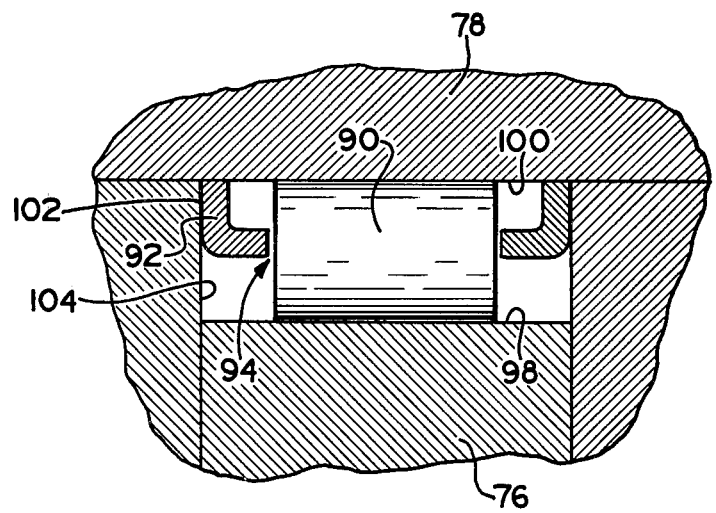

FIGS. 2 and 3 more fully disclose an example of a bidirectional one way clutch which could be used in the present invention. For illustrative purposes, the clutch has been designated as clutch 74 interconnecting the input 76 with the output 78. The bidirectional one way clutch 74 driving locks or interconnects the input 76 with the output 78 when the input 76 tries to rotate faster than the output 78. The clutch 74 includes a shiftable roller cage or carrier 92 and a plurality of rollers 90, supported in openings 94 in the shiftable roller cage 92. The openings 94 are dimensioned so as to permit the rollers 90 to be freely rotatable and radially shiftable relative to the cage 92, and yet prevent circumferential movement of the rollers relative thereto.

The clutch means 74 includes an assembly 96 which is a part of the input member 76. The assembly 96 is provided with a plurality of V-shaped grooves 98 which are circumferentially spaced around the outer periphery thereof and correspond in number to the number of rollers 90. The rollers 90 engage sides of the V-shaped grooves 98 on the assembly 96 so that shifting movement of the roller cage 92 simultaneously moves the rollers 90 circumferentially relative to the assembly 96 to cam the rollers 90 generally radially outwardly.

The roller cage 92 is illustrated in a neutral position in FIG. 2 and is shiftable or movable from a position shown in FIG. 2 in a clockwise or counterclockwise direction to shift the rollers 90 to either of the positions shown by phantom lines as 90' or 90". When the rollers are in the phantom line position the rollers 90 will permit relative rotation between the output 78 and input 76 as long as the input 76 rotates slower absolute than the output 78.

As is more fully illustrated in FIG. 3, the outer surface 102 of the roller cage 92 lightly engages with the surface 104 which is a stationary surface that is part of or connected to the main housing which encompasses the auxiliary gear drive system 50 and case 12. The engagement of the surface 102 of the carrier 92 with the stationary surface 104 causes a light drag to be exerted on the carrier 92 to shift the carrier either clockwise or counterclockwise depending on the direction of rotation of the cage 92. When the carrier 92 is shifted the rollers 90 will move to one of their phantom line positions depending on the direction of rotation of the differential mechanism and the output 78 will be free to rotate with respect to the input 76 unless the input tries to rotate faster than the output. When the output 78 is rotating faster than the input 76 the roller cage 92 will bias the rollers 90 to one of their phantom line positions and relative rotation between the input 76 and the output 78 will be permitted. However, when the input 76 tries to go faster than the output 78 the rollers 90 are wedgingly engaged between the side surfaces of the grooves 98 and a cylindrical surface 100 forming the inner periphery of the output member 78 to drivingly connect the output 78 and the input 76 together.

The speed of roller cage 92 causes a driving force to be provided by the drag of the stationary surface 104 against the roller cage 92 to effect a circumferential shifting movement of the cage 92 relative to the assembly 96 so that the clutch means 74 is in position to drivingly connect the input 76 and the output 78 should the output try to rotate slower than the input. The shifting force provided by the frictional engagement of the stationary force 104 with the cage 92 effects movement of the roller cage 92 and rollers 90 carried thereby, into their phantom line position to effect driving engagement between the surfaces of the grooves 98 and the surface 100 of the output member 78 if the output 78 tries to go slower than the input 76. It should be apparent that the clutch 74 will operate as a bidirectional one way clutch to connect the input to the output when the output rotates slower than the input in first and second directions depending upon the direction of shifting of the roller cage 92 relative to the assembly 96. The roller cage 92 will shift in a first direction when the differential is rotating in a first direction such as forward and will shift in a second direction when the differential is rotating in a second direction such as reverse.

The differential 12 operates in a normal manner as long as the wheels associated with the output shafts 26, 28 are not slipping relative to each other by a predetermined amount. If the wheels are rotating at the same speed or approximately the same then neither output shaft 26, 28 will have a speed which is less than the speed of gear 70 which is equal to the given percentage of the case speed as dictated by the gear ratio between the ring gear 30 and the auxiliary drive gear 70. The gear ratio will be such that the differential would operate in a normal open manner under all normal traffic conditions. If under slippery conditions, one of the wheels associated with shafts 26, 28 starts to slip, the speed of the output shaft associated with the slipping wheel will increase and the speed of the output shaft associated with the non slipping wheel will remain low due to the fact that the input speed equals the average of the output speeds in an open differential. If the speed of either output shaft 26, 28 is reduced with respect to the case 12 and the output speed went below the preset percentage of the case speed as dictated by the gear ratio between gears 30 and 70, the proper one way clutch 74, 80 would engage and provide required driving torque through the auxiliary gear system to the non slipping output shaft. This would prevent further case spin-up even if all drive torque had to be provided through the auxiliary gear system. Thus, vehicle traction would be regained to the limit of vehicle power or the point of slip of the tractive wheel. Thus, the differential is permitted to differentiate up to and not to exceed a given percentage of input speed. The actual input speed at which the auxiliary drive is actuated will vary depending upon the input speed and the gear ratio between the ring gear 30 and the auxiliary gear 70. The differential speed at which the auxiliary gear drive is actuated will vary depending on input speed. The differential speed does not need to be as large when the input speed is slow than when the input speed is fast.

To more fully understand the operation of the present differential assembly, the following examples are provided. In each of these examples, it is assumed that the gears 56, 60, 64 and 66 are the same size and rotate at the same speed as the casing 12 during non slipping operation. Gear 30 rotates with the casing 12 and gear 70 has a ratio to gear 30 whereby gear 70 rotates at 70% of the speed of gear 30. Under normal conditions the differential 10 acts as an open differential and the output speed of shaft 28 equals or essentially equals the output speed of shaft 26, and gears 70 rotates slower than gears 60 and 66 which are rotating at the speed of output shafts 28, 26.

Assuming gear 30 rotates at 100 rpm, then gear 70 rotates at 70 rpm. Under a no slip condition, if gear 30 rotates at 100 rpm, then gears 56, 60, 64 and 66 all rotate at 100 rpm and gear 70 is rotating slower than gears 66 and 60. In this case, the auxiliary drive train 50 is not actuated and one way clutches 74, 80 are disengaged.

If there is a small difference in speed such as in a turn or moderate slip between the output shafts 26, 28, the clutches 74, 80 will also not engage. For example, if gear 30 is rotating at 100 rpm, gear 70 rotates at 70 rpm, and, if the wheel associated with output shaft 28 is rotating at 110 rpm, then gear 64 will rotate at 90 rpm. This will cause gear 66 to rotate at 90 rpm which is faster than the 70 rpm at which gear 70 rotates. Thus, since gear 66 is rotating faster than gear 70, no locking would occur.

If there is large slip between the output shafts 26 and 28, one of the clutches 74, 80 will engage. For example, if gear 30 is rotating at 100 rpm, gear 70 will rotate at 70 rpm and if a wheel associated with output shaft 28 slips and is rotating at 130 rpm, then gears 64 and 66 will rotate at 70 rpm. At this point the one way clutch 80 between auxiliary gear 70 and auxiliary gear 66 will engage as the output member 84 of clutch 80 is now rotating at the same speed as the input member 82. Engagement of clutch 80 will prevent a further spin-up of case or output shaft 28 and associated wheel by directing all additional input torque to the non slipping wheel through clutch 80 and gears 66, and 64 to shaft 26 and its associated traction wheel. It should be appreciated that with an input speed of 100 rpm, gear 66 will not be able to rotate slower than 70 rpm due to the fact that the clutch 80 would engage to thereby transfer additional torque to the output gear 64 and non slipping output shaft 26 via the out way clutch 80.

The auxiliary gear system 50 provides additional output torque to a non slipping output shaft if one of the output shafts 28, 26 is slipping and one of the one way clutches 74, 80 locks up. For example, assume that output shaft 28 is slipping and the one way clutch 80 locks up. If 200 ft. lbs. of torque are directed to the input ring gear 30, and output slipping shaft 28 is driven at 50 ft. lbs. of torque, then non slipping output shaft 26 will be driven at 50 ft. lbs. of torque through the gear train 14 of the differential due to the fact that a normal open differential transfers equal torque to the output shafts. When clutch 80 locks up an additional 100 ft. lbs. of torque will be transferred through the auxiliary gear drive 50 via the clutch 80 and gears 66, 64 to allow the non slipping output shaft 26 to now transmit 150 ft. lbs. of torque to the output wheel associated therewith. Thus, the present structure will provide for 50 ft. lbs. of torque of the slipping output shaft 28 and 150 ft. lbs. of torque on the non slipping output shaft 26. Thus the input torque equals the output torque and the majority of the torque is available at the non slipping wheel.

While the present embodiment has been disclosed as directing torque from an input to a pair of output shafts through the main differential and the auxiliary gear drive system, it should be appreciated that the output shafts could also act to direct torque to the present structure, which torque would be transferred from the output of the auxiliary gear drive in the main differential. For example, it would be possible for the output shaft 28 to have a negative torque exerted thereon. For example, if the input toreque directed to the case were 100 ft. lbs. at 100 rpm, the differential would direct 50 ft. lbs. of torque to each wheel. Assuming that the low traction wheel could only take 20 ft. lbs. of torque, then there would be an excess of 30 ft. lbs. of torque transferred to the low traction wheel. If the low traction wheel tried to exceed 130 rpm (assuming gear 70 rotates at 130 and assuming the gear ratio between gears 30 and 70 is reversed and the clutches are reversed) then when the low traction gear tried to exceed the 130 rpm, 30 foot pounds of torque would be transferred back to the input via the auxiliary drive system. At this time there would be 130 ft. lbs. of torque being applied to the input, i.e., the original 100 and now the 30, which is fed back from the low traction wheel. At this time the differential would act to apply 65 ft. lbs. of torque to each of the output shafts. Since the low traction wheel could absorb only 20 ft. lbs. of torque, then 45 ft. lbs. of torque would be fed back through the auxiliary drive system to the input. At this stage the input would then have 145 ft. lbs. of torque applied to it. The feedback would continue until there was a 60 ft. lbs. feedback from the low traction wheel. At that time the input torque on the case would be 160 ft. lbs., i.e., 100 ft. lbs. from an external source and 60 ft. lbs. from feedback from the low traction wheel. If the input was 160 ft. lbs., then 80 ft. lbs. would be transferred to each output shaft. Since the low traction wheel would absorb only 20 ft. lbs., then 60 ft. lbs. would continue to be fed back and the input torque would remain at 160 ft. lbs. with 20 ft. lbs. being applied to the low traction wheel and 80 ft. lbs. being applied to the high traction wheel. In this example, it should be apparent that the auxiliary drive system acts to feed back the negative torque from the low traction wheel.

It should be apparent that the present structure prevents excessive differentiation by utilizing an auxiliary drive in addition to the differential. Any differential speed that drops below the predetermined percentage as determined by the gear ratios are unaffected by the auxiliary drive system and the unit operates in a normal open differential manner. If the differentiation tends to try to increase above this value, further increases will be prevented due to the auxiliary torque transmitting mechanism which transmits all additional input torque to the slower or non-slipping output shaft. The auxiliary torque transmitting mechanism is sufficient to prevent any additional differentiation but will disengage completely once the differentiation returns within its prescribed limits (even if only a fraction of rpm less than the maximum permitted). In comparing the present system to a locking differential, it should be apparent that the locking differential may start preventing differentiation at a preset differential speed but it often will substantially exceed this speed prior to obtaining sufficient torque to perform the locking function. Also, once a locking differential has accomplished lock, it will not permit differentiation until the wheel that has previously spun up becomes the slower of the two wheels. This is undesirable in that the engagement is very abrupt to the system and may not prevent differentiation for a substantial period of time, especially, under conditions of mixed tire sizes.

From the foregoing it should be apparent that a new and improved differential assembly including an auxiliary gear drive system has been provided. The differential assembly includes a case, an input, pinion means, a pair of side gears, a first output shaft associated with one of the side gears, a second output shaft associated with the other of the side gears, first gear means associated with the first output shaft and rotating at a speed dependent upon the speed of the first output shaft, second gear means associated with the second output shaft and rotating at a speed dependent upon the speed of the second output shaft and third gear means associated with the casing and rotating at a speed dependent upon the speed of the casing. A first clutch is provided for interconnecting the third gear means and the first gear means to enable the third gear means to provide auxiliary driving torque to the first output shaft through the first gear means when the rotational speed of the input exceeds the rotational speed of the first output shaft by a predetermined amount. Second clutch means is provided for interconnecting the third gear means and the second gear means to enable the third gear means to supply additional driving torque to the second output shaft via the second gear means when the rotational speed of the input exceeds the rotational speed of the second output shaft by a predetermined amount.

What I claim is:

1. A differential assembly comprising a case, input means associated with said case for directing input torque thereto to effect rotation of the case, pinion means associated with said case, a pair of side gears meshing with said pinion means, a first output driven by one of said side gears, a second output driven by the other of said side gears, first torque transmitting means associated with said first output, rotating at a speed dependent upon the speed of said first output, and adapted to transmit torque to said first output, second torque transmitting means associated with said second output, rotating at a speed dependent upon the speed of said second output, and adapted to transmit torque to said second output, third torque transmitting means associated with said case, rotating at a speed dependent upon the speed of said case, and adapted to transmit torque from said case, first clutch means responsive to said speed of said input means varying from said speed of said first output by a predetermined value to interconnect said first and third torque transmitting means to enable said third torque transmitting means to supply additional torque to said first output and prevent said speed of said input means from varying from said speed of said first output by more than said predetermined value, and second clutch means responsive to said speed of said input means varying from said speed of said second output by a predetermined value to interconnect said second and third torque transmitting means to enable said third torque transmitting means to supply additional torque to said second output and prevent said speed of said input means from varying from said speed of said second output by more than said predetermined value, said first clutch means being a bidirectional one way clutch which is operable to enable said third torque transmitting means to drive said first torque transmitting means when the speed of said input in a first direction exceeds the rotational speed of said first output by said predetermined value and when the rotational speed of said input means in a second direction opposite said first direction exceeds the rotational speed of said first output by said predetermined value, said second clutch means being a bidirectional one way clutch which is operable to enable said input means to drive said second torque transmitting means when the rotational speed of said input means in a first direction exceeds the rotational speed of said second output by a predetermined value and when the rotational speed of said input means in a second direction opposite said first direction exceeds the rotational speed of said second output by said predetermined value.

2. A differential assembly as defined in claim 1 wherein said first torque transmitting means includes a first output gear operatively connected to said first output for rotation therewith and a first auxiliary gear operatively connected to said first output gear for rotation therewith and wherein said second torque transmitting means includes a second output gear operatively connected to said second output for rotation therewith and a second auxiliary gear operatively connected to said second output gear for rotation therewith.

3. A differential assembly as defined in claim 2 wherein said third torque transmitting means includes a third gear operatively connected to said casing for rotation therewith and a third auxiliary gear operatively connected to said third gear for rotation therewith.

4. A differential assembly as defined in claim 3 wherein said first clutch means is operable to interconnect said first auxiliary gear and said third auxiliary gear and said second clutch means is operable to interconnect said second auxiliary gear and said third auxiliary gear.

5. An auxiliary drive system for supplying additional output torque to a non slipping output shaft of a differential assembly having a slipping output shaft and a non slipping output shaft, a case, input means associated with the case for driving the case to effect rotation thereof, pinion means associated with the case, and a pair of side gears meshing with said pinion means, one of said pair of side gears driving one of said output shafts and the other of said pair of side gears driving the other of said output shafts, said auxiliary gear drive system comprising first torque transmitting means associated with said one output shaft and rotating at a speed dependent upon the speed of said one output shaft, second torque transmitting means associated with said other output shaft and rotating at a speed dependent upon the speed of said other output shaft, third torque transmitting means associated with the input means and rotating at a speed dependent upon the speed of said input means, and clutch means operatively connected to said third torque transmitting means and selectively connectable with said first torque transmitting means or said second gear means, said clutch means connecting said third torque transmitting means and said first torque transmitting means when the rotational speed of said input means exceeds the rotational speed of said one output shaft by a predetermined amount indicating said other output shaft associated with said second torque transmitting means is slipping relative to said one output shaft to enable said third torque transmitting means to supply additional output torque through said clutch means to said first torque transmitting means and said one output shaft which is not slipping, said clutch means connecting said third gear means to said second gear means when the rotational speed of said input means exceeds the rotational speed of said other input shaft by a predetermined amount indicating said one output shaft associated with said first torque transmitting means is slipping relative to said other output shaft to enable said third torque transmitting means to supply additional output torque through said clutch means to said second torque transmitting means and to said other output shaft which is not slipping, said clutch means includes first clutch means and second clutch means, said first clutch means being a bidirectional one way clutch which is operable to enable said third torque transmitting means to drive said first torque transmitting means when the rotational speed of said input means in a first direction exceeds the rotational speed of said one output shaft by a predetermined amount indicating that said other output shaft is slipping relative to said one output shaft and when the rotational speed of said input means in a second direction opposite said first direction exceeds the rotational speed of said one output shaft by a predetermined amount indicating said other output shaft is slipping relative to said one input shaft and said second clutch means being a bidirectional one way clutch which is operable to enable dsaid third torque transmitting means to drive said second torque transmitting means when the rotational speed of said input means in a first direction exceeds the rotational speed of said other output shaft by a predetermined amount indicating said one output shaft is slipping relative to said other output shaft and when the rotational speed of said input means in a second direction opposite said first direction exceeds the rotational speed of said other output shaft by a predetermined amount indicating said one shaft is slipping relative to said other output shaft.

6. An auxiliary drive system as defined in claim 5 wherein said first torque transmitting means includes a first output gear operatively connected to said one output shaft for rotation therewith and a first auxiliary gear operatively connected to said first output gear for rotation therewith and wherein said second torque transmitting means includes a second output gear operatively connected to said other output shaft for rotation therewith and a second auxiliary gear operatively connected to said second output gear for rotation therewith.

7. An auxiliary drive system as defined in claim 6 wherein said third torque transmitting means includes a third gear operatively connected to said casing for rotation therewith and a third auxiliary gear operatively connected to said third gear for rotation therewith.

8. An auxiliary drive system as defined in claim 7 wherein said first clutch is operable to interconnect said first auxiliary gear and said third auxiliary gear and said second clutch is operable to interconnect said second auxiliary gear and said third auxiliary gear.

9. An auxiliary drive system as defined in claim 5 wherein said first torque transmitting means includes a first output gear operatively connected to said one output shaft for rotation therewith and a first auxiliary gear operatively connected to said first output gear for rotation therewith and wherein said second torque transmitting means includes a second output gear operatively connected to said other output shaft for rotation therewith and a second auxiliary gear operatively connected to said second output gear for rotation therewith.

10. An auxiliary drive system as defined in claim 9 wherein said third torque transmitting means includes a third gear operatively connected to said casing for rotation therewith and a third auxiliary gear operatively connected to said third gear for rotation therewith.

11. An auxiliary drive system as defined in claim 5 wherein said third torque transmitting means is selectively connectable to said first or second torque transmitting means by said clutch means to supply additional torque to said non slipping output shaft which additional torque is approximately equal to the difference between the torque supplied to the input means and the torque supplied to said slipping output shaft.

* * * * *